United States Patent
Hayashi et al.

(10) Patent No.: US 7,524,264 B2
(45) Date of Patent: Apr. 28, 2009

(54) VEHICLE CONTROLLER OF A VEHICLE POWER TRANSMISSION DEVICE

(75) Inventors: Masahiko Hayashi, Kanagawa (JP); Tatsuhiko Ebara, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 443 days.

(21) Appl. No.: 10/588,336

(22) PCT Filed: Feb. 3, 2005

(86) PCT No.: PCT/JP2005/001986

§ 371 (c)(1),
(2), (4) Date: Aug. 3, 2006

(87) PCT Pub. No.: WO2005/075239

PCT Pub. Date: Aug. 18, 2005

(65) Prior Publication Data

US 2007/0173374 A1    Jul. 26, 2007

(30) Foreign Application Priority Data

Feb. 6, 2004    (JP)    ............................. 2004-030930

(51) Int. Cl.
*B60W 10/00*    (2006.01)
(52) U.S. Cl. ...................................... 477/78
(58) Field of Classification Search ............... None
See application file for complete search history.

(56) References Cited

U.S. PATENT DOCUMENTS

| | | | | |
|---|---|---|---|---|
| 4,361,060 A | * | 11/1982 | Smyth ......................... | 477/78 |
| 5,441,462 A | * | 8/1995 | Chan ............................ | 477/74 |
| 5,595,551 A | * | 1/1997 | Hedstrom et al. ........... | 477/109 |
| 6,033,342 A | * | 3/2000 | Steinel et al. ................ | 477/181 |
| 6,500,093 B2 | * | 12/2002 | Genise et al. ............... | 477/109 |
| 6,530,861 B1 | * | 3/2003 | Nakashima ................... | 477/85 |
| 6,658,341 B2 | | 12/2003 | Inoue et al. | |
| 6,852,066 B2 | * | 2/2005 | Senger et al. ............... | 477/181 |
| 6,962,551 B1 | * | 11/2005 | Genise et al. ............... | 477/109 |

(Continued)

FOREIGN PATENT DOCUMENTS

DE    102 54 468 A1    6/2003

(Continued)

*Primary Examiner*—Dirk Wright
(74) *Attorney, Agent, or Firm*—McGinn IP Law Group, PLLC

(57) ABSTRACT

In a vehicle power transmission device equipped with an automatic clutch, the gear-change for shifting up is effected suppressing a sudden increase in the engine rotational speed that results when the automatic clutch is disconnected, preventing deterioration in the drive feeling caused by the change of gear such as a shock due to the change of gear. At the time of changing the gear for shifting up, an engine controller (11) executes a pre-reduction control for decreasing the output of the engine 1 for a predetermined period of time prior to disconnecting the clutch (3). Since the engine output has been decreased, the rotational speed of the engine (1) does not suddenly rise despite the vehicle traveling load is removed as a result of disconnecting the clutch 3. A target value for decreasing the engine output is suitably set depending upon the vehicle operating conditions, and a sudden increase in the rotational speed is prevented in all gears while relaxing the shock of gear-change caused by a sharp change in the acceleration.

9 Claims, 5 Drawing Sheets

U.S. PATENT DOCUMENTS

2003/0109357 A1  6/2003  Tabata

FOREIGN PATENT DOCUMENTS

| | | |
|---|---|---|
| EP | 1 243 806 A2 | 9/2002 |
| JP | 60-11757 | 1/1985 |
| JP | 6-117285 | 4/1994 |
| JP | 6-323172 | 11/1994 |
| JP | 7-26995 | 1/1995 |
| JP | 11-22500 | 1/1999 |
| JP | 2002-295529 | 10/2002 |
| JP | 2003-232236 | 8/2003 |

* cited by examiner

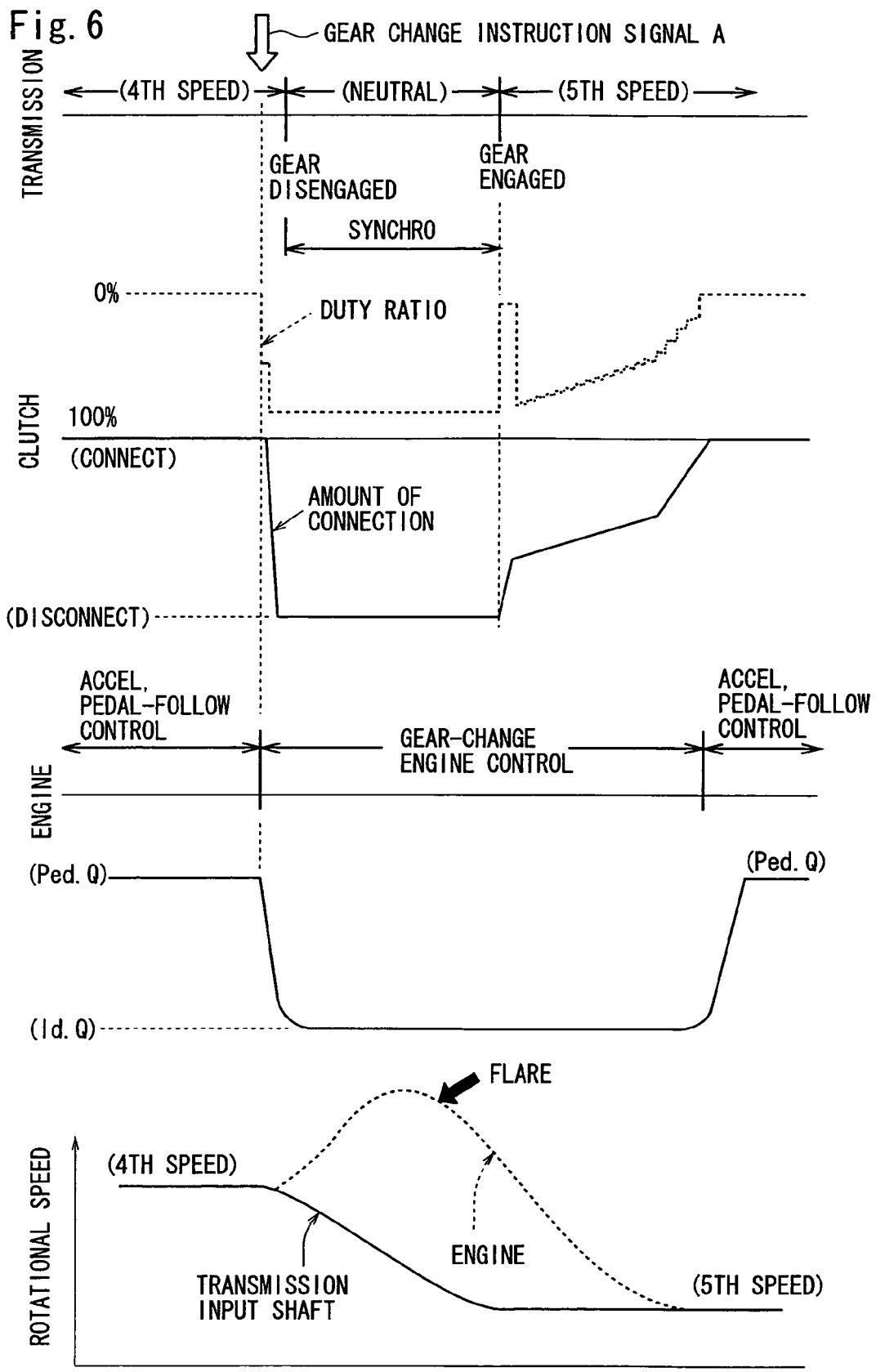

VEHICLE CONTROLLER OF A VEHICLE POWER TRANSMISSION DEVICE

TECHNICAL FIELD

The present invention relates to a vehicle controller of a vehicle power transmission device which includes an automatic clutch between an engine and a transmission, the clutch being automatically connected and disconnected at the time of changing the gear by shifting a gear of the transmission depending upon the traveling conditions of the vehicle.

BACKGROUND ART

A variety kinds of vehicle power transmission devices for easy driving have been developed in an attempt to facilitate the driving of vehicles and to reduce fatigue to the drivers, and have been employed for the vehicles placed in the market. One of them may be an easy-to-drive device which uses a transmission of the type of a parallel axis gear mechanism similar to that of a so-called manual vehicle combined with an automatic clutch, so that the clutch can be automatically connected or disconnected at the time when the driver attempts to change the gear by shifting the gear by means of a gear-change lever without really using the clutch pedal. There has also been provided a power transmission device which automatically changes the gear depending upon the traveling conditions of the vehicle by using an electronic controller instead of operating the gear-change lever by the driver. As a transmission of a high class, there has further been provided a power transmission device equipped with a manual gear-change mode in which the driver changes the gear and an automatic gear-change mode in which an electronic controller automatically changes the gear, either one of which modes being selected by the driver.

In recent years, there has been developed a power transmission device having a fluid coupling interposed between an engine and an automatic clutch for use in vehicles equipped with a diesel engine. With the fluid coupling being interposed, the vehicle can be started by utilizing slipping between the pump and the turbine in the fluid coupling particularly when the vehicle uses a diesel engine that produces a large torque in a region of low engine rotational speeds. Namely, this easily realizes a smooth start without requiring sophisticated clutch work which is carried out at the time of starting a manual vehicle and, at the same time, absorbs fluctuation in the engine torque during the idling and, further, reduces vibration and noise.

In the power transmission device having the automatic clutch as described above, in general, the engine is equipped with an electronic engine controller. The engine controller stores, for example, a map that determines the amount of fuel supply depending, for example, upon the amount the accelerator pedal is depressed by the driver and the engine rotational speed. When normally traveling, the engine controller controls the amount of fuel supplied to the engine by using the amount the accelerator pedal is depressed as a basic parameter (the engine control for controlling the amount of fuel supply by using the amount the accelerator pedal is depressed as a basic parameter is hereinafter referred to as "accelerator pedal-follow control"). The engine controller is further connected to a clutch controller that controls the clutch; i.e., these two controllers are so linked together as to control the operation condition of the engine depending upon a condition of connection of the clutch at the time of changing the gear.

FIG. 1 schematically illustrates the above vehicle power transmission device. In the power transmission device, a fluid coupling 2 is linked at the back of a diesel engine 1 and a transmission 4 having a parallel axis gear mechanism is further linked thereto via a wet multi-plate clutch 3. An output shaft 41 of the transmission 4 drives the wheels that are not shown of the vehicle. Except when the vehicle is going to start, a pump 21 (integral with an output shaft of the diesel engine 1) and a turbine 22 (integral with an input shaft 31 of the wet multi-plate clutch 3) of the fluid coupling 2 are coupled together by a lockup clutch 23 and, thus, the output shaft of the diesel engine 1 is directly coupled to the input shaft 31 of the wet multi-plate clutch 3. The transmission 4 is an ordinary transmission of the type of a parallel axis gear mechanism in which a gear-change sleeve is brought into mesh with a gear spline that is formed in a gear integrally therewith, and is equipped with a known synchronizing mechanism which may be a synchronizer ring.

The diesel engine is equipped with an engine controller 11 and the wet multi-plate clutch 3 is equipped with a clutch controller 31, and these controllers are so linked together as to control the diesel engine 1 and the wet multi-plate clutch 3. These controllers receive rotational speed signals from a rotational speed sensor 51 that detects the rotational speed of the input shaft 32 of the wet multi-plate clutch 3 (rotational speed of the turbine 22 of the fluid coupling 2), from a rotational speed sensor 52 that detects the rotational speed of the output shaft 33 of the wet multi-plate clutch 3 (rotational speed of the input shaft of the transmission 4) and from a rotational speed sensor 53 that detects the rotational speed of the output shaft 41 of the transmission 4. The controllers use the rotational speed signals for the control operation at the time of changing the gear.

The wet multi-plate clutch 3 in the power transmission device is a general wet multi-plate clutch in which many friction plates spline-fitted to the input shaft 32 and many friction plates spline-fitted to the output shaft 33 are alternately arranged. The amount of connecting the wet multi-plate clutch 3 is controlled by adjusting the hydraulic pressure acting on a piston that pushes the friction plates depending upon a duty ratio D of pulses produced from the clutch controller 31 as taught in, for example, JP-A-2002-295529. Here, the wet multi-plate clutch 3 is completely connected when the duty ratio is 0%, and is disconnected when the duty ratio is 100% since the amount of connection is zero.

Referring to FIG. 6, described below is the operation of the power transmission device at the time of changing the gear for shifting up (fourth speed→fifth speed). At the time of changing the gear, the clutch controller 31 that had been producing a duty ratio of 0% now produces a duty ratio of 100% in response to a gear-change instruction signal A to disconnect the wet multi-plate clutch 3 and, hence, to separate the transmission 4 away from the diesel engine 1. The gear (fourth speed) of the transmission 4 that had been transmitting the power up to now is disengaged to bring the transmission 4 to the neutral. The transmission 4, thereafter, is brought into mesh with a new gear (fifth speed). During this period, the rotational speed of the output shaft of the transmission 4 is brought into synchronism with the rotational speed of the new gear by the synchronizing mechanism, and the mesh with the new gear is accomplished (gear engaged) at a moment the synchronism is obtained and, thus, change of the gear of the transmission 4 is completed. In the case of the manual operation, the gear-change instruction signal A is produced when the driver's attempt for changing the gear is detected by a detector installed in the knob of a gear-change lever 61 that is operated by the driver. When the transmission 4 is in the state of automatically changing the gear relying on an actuator or the like, the vehicle controller judges whether it is necessary to change the gear depending upon the vehicle speed and the amount the accelerator pedal 62 is depressed, and the gear-change instruction signal A is automatically produced when it is necessary to change the speed.

After the gear has been engaged, the clutch controller 31 connects the wet multi-plate clutch 3 so that the output of the diesel engine 1 is transmitted again to the transmission 4. In this case, however, in order to avoid the shock of gear-change caused by a sudden transmission of torque or to avoid the engine stall, the clutch controller 31 works to gradually decrease the duty ratio and to gradually increase the amount for connecting the wet multi-plate clutch 3 as disclosed in, for example, JP-A-2002-295529. When the wet multi-plate clutch 3 is completely connected, the diesel engine 1 is in a state of being directly coupled to the input shaft of the transmission 4 and, thus, changing the gear is finished by the transmission 4 and the wet multi-plate clutch 3. In practice, the wet multi-plate clutch 3 has an invalid region where the amount of connection does not almost increase despite the hydraulic pressure is elevated from the disconnected state. Therefore, the duty ratio is very decreased for a very short period of time so that the invalid region is quickly passed through. Thereafter, the clutch controller 31 produces such a duty ratio that enables the wet multi-plate clutch 3 to be connected in a proper amount.

As shown in the lower portion of FIG. 6, when the wet multi-plate clutch 3 is disconnected in response to the gear-change instruction signal A and the transmission 4 is separated away from the diesel engine 1, the rotational speed of the input shaft of the transmission 4 (output shaft 33 of the wet multi-plate clutch 3) quickly drops down to a rotational speed that corresponds to the new gear (fifth speed) accompanying the operation of the synchronizing mechanism. Concerning the output shaft of the diesel engine 1 (input shaft 32 of the wet multi-plate clutch 3), on the other hand, there takes place a phenomenon of a so-called flare (rev-up of the engine) in which the rotational speed suddenly increases since the diesel engine 1 is suddenly liberated from the load for traveling the vehicle. When this phenomenon takes place, the engine noise increases, a difference in the rotational speed increases between the input shaft and the output shaft of the clutch, and an increased period of time is required for completely connecting the clutch.

To prevent a sudden increase in the rotational speed and to decrease a difference between the rotational speed of the input shaft 32 of the wet multi-plate clutch 3 and the rotational speed of the output shaft 33 thereof, the control mode of the engine controller 11 at the time of changing the gear is changed over to a gear-change engine control that is not dependent upon the amount the accelerator pedal 62 is depressed, and the amount of fuel supplied to the diesel engine 1 is greatly limited, e.g., decreased to an amount of fuel during the idling of the engine. That is, in response to the gear change instruction signal A, the engine controller 11 discontinues the accelerator pedal-follow control and performs a mode of gear-change engine control to control the diesel engine 1 independently of the amount the accelerator pedal 62 is depressed. This greatly decreases the amount of fuel but is still often accompanied, however, by the occurrence of flare due to time delay in the control. The gear-change engine control continues from when the gear-change instruction signal A is input until the connection of the wet multi-plate clutch 3 is completed. Thereafter, the engine control returns back to the normal accelerator pedal-follow control. At the start and at the end of the gear-change engine control, a so-called damping is executed for increasing or decreasing the amount of fuel stepwise for short periods of time to avoid adverse effect caused by a sudden change in the amount of fuel.

At the time of changing the gear for shifting up, the clutch is disconnected, the output of the engine is temporarily shut off, and the vehicle decelerates. Before shifting up, the driver, in many cases, is attempting to accelerate the vehicle by depressing the accelerator pedal. Therefore, a deceleration at the time of changing the gear gives the driver a so-called sluggish feeling and a shock of gear-change, and impairs the drive feeling. With the low gears such as the first speed and the second speed, in particular, the transmission produces a large output torque and the vehicle usually accelerates sharply. Therefore, changing the gear for shifting up with low gears gives the driver a more sluggish feeling. The above deterioration in the drive feeling is called "acceleration spoiling".

In order to prevent the drive feeling from impaired by the "acceleration spoiling" at the time of changing the gear, the present applicant has developed a gear-change controller as disclosed in JP-A-60-11757. This gear-change controller is "provided with means for judging whether the engine can produce a surplus of acceleration for the horsepower required for traveling the vehicle, and when the change of gear is the shifting up, turns the engine throttle toward the closing direction prior to disconnecting the clutch to decrease the surplus of torque". That is, when the engine output is considerably greater than the horsepower required for the traveling and the acceleration of the vehicle is exceeding a predetermined amount, the engine output is squeezed for a short period of time prior to disconnecting the clutch for changing the gear. This lowers the acceleration of the vehicle prior to changing the gear and relaxes a sudden "acceleration spoiling".

The above controller aims at relaxing the "acceleration spoiling" and decreases the engine output prior to disconnecting the clutch for changing the gear. At a moment when the clutch is disconnected, therefore, the engine output has been decreased to a considerable degree, and the engine rotational speed is suppressed from increasing even when the load for traveling the vehicle is removed. Therefore, a control for decreasing the engine output prior to disconnecting the clutch for changing the gear (hereinafter called "pre-reduction control") is effective in preventing the occurrence of flare at the time of changing the gear.

According to the art disclosed in the above JP-A-60-11757, however, the pre-reduction control that precedes the operation for disconnecting the clutch is executed when the engine output is considerably greater than the horsepower that is required for the traveling and when the acceleration of the vehicle is exceeding a predetermined amount. In other words, the pre-reduction control is not executed when the above conditions are not satisfied, and the flare may occur at the time of shifting up. Further, the amount of returning back the throttle for lowering the engine output is set to be constant. Depending upon the operating conditions, therefore, the effect of the pre-reduction control becomes insufficient, and the rotational speed is not decreased by a proper amount. Or, the pre-reduction control works so effectively that the rotational speed often decreases excessively.

DISCLOSURE OF THE INVENTION

In dealing with a vehicle power transmission device equipped with an automatic clutch, it is a basic problem of the present invention to quickly change the gear by suppressing an increase in the engine rotational speed that results from the disconnection of the automatic clutch at the time of changing the gear for shifting up to avoid the flare and by bringing the engine rotational speed into agreement with the rotational speed of the transmission input shaft in an early time. At the time of changing the gear for shifting up, the invention suitably sets a target value for decreasing the engine output depending upon the operating conditions of the vehicle prior to disconnecting the clutch in order to prevent the occurrence of flare in all gears while suitably relaxing the "acceleration spoiling".

It is, therefore, an object of the present invention to provide an engine controller which suitably sets a target value for decreasing the engine output depending upon the operating conditions of the vehicle prior to disconnecting the clutch at the time of changing the gear for shifting up in order to prevent the occurrence of flare in all gears and, at the same time, to relax the "acceleration spoiling" by a suitable amount. Namely, as described in claim 1, the present invention is concerned with "an engine controller in a vehicle power transmission device including an engine, a clutch and a transmission, wherein:

the clutch is equipped with a clutch controller which disconnects the clutch at the time of gear-change of said transmission;

the engine is equipped with an engine controller which controls the engine based on the amount the accelerator pedal is depressed as a basic parameter, wherein at the time of gear-change, the engine controller, in response to a gear-change instruction signal, performs a gear-change engine control for controlling the engine independently of the amount the accelerator pedal is depressed; and in the gear-change engine control at the time of gear-change of shifting up, the engine controller executes a control for decreasing the engine output for a predetermined period of time prior to disconnecting the clutch, and the target value for decreasing the output depends upon the vehicle operating conditions of when the gear-change instruction signal is output".

In the vehicle power transmission device equipped with an automatic clutch of the present invention as described above, a pre-reduction control is executed at the time of changing the gear for shifting up to decrease the engine output prior to disconnecting the clutch. Therefore, even when the clutch is disconnected for changing the gear and the load for traveling the vehicle carried by the engine is suddenly removed, an increase in the engine rotational speed can be suppressed, the occurrence of flare can be avoided and noise is prevented from increasing. Here, the rotational speed of the transmission input shaft decreases due to the change of gear of shifting up. By suppressing the increase in the engine rotational speed relying upon the pre-reduction control, however, the rotational speed of the engine that is disconnected at the time of changing the gear can be brought into agreement with the rotational speed of the transmission input shaft in an early time after the gear is engaged, connection of the clutch can be quickly completed, and the time required for changing the gear can be shortened.

In the present invention, further, the target value for decreasing the engine output by the pre-reduction control is set depending upon the vehicle operating conditions of when the gear-change instruction signal is output. When the gear is changed while the vehicle is in operation using a low gear, a great decrease in the engine output by the pre-reduction control brings about the same result as the "acceleration spoiling", and changing the gear produces a large shock due to the pre-reduction control. The target value for decreasing the engine output is set depending upon the vehicle operating conditions. When a low gear is used, for example, the target value of the engine output by the pre-reduction control is set to be relatively high to suitably relax the "acceleration spoiling" at the time of changing the gear for shifting up, making it possible to prevent the occurrence of flare in all gears while avoiding deterioration in the drive feeling. According to the technology disclosed in the above JP-A-60-11757, the throttle is returned back in a constant amount for decreasing the engine output, still making it difficult to carry out the pre-reduction control in a suitable amount to meet the operating conditions.

As described in claim 2, it is desired that the target value for decreasing the output is set depending upon the gear of when the gear-change instruction signal is output while the vehicle is in operation, and that the target value for decreasing the output is set to become smaller as a higher gear position is used.

As described in claim 3, the target value for decreasing the output can be set as a target value for decreasing the rotational speed. In this case as described in claim 4, the target value for decreasing the rotational speed can be set depending upon the rotational speed of the engine of when the gear-change instruction signal is output.

As described in claim 5, further, the target value for decreasing the output may be set depending upon the amount of fuel supplied to the engine of when the gear-change instruction signal is output. As described above, the target value for decreasing the engine output by the pre-reduction control can be accomplished by the embodiments described in claims 2 to 5.

The pre-reduction control may not often be necessary depending upon the vehicle operating conditions. As described in claim 6, therefore, it is desired that the engine controller is provided with means which determines whether the control be executed for decreasing the engine output prior to disconnecting the clutch depending upon the vehicle operating conditions of when the gear-change instruction signal is output. In this case as described in claim 7, the vehicle operating conditions of when the gear-change instruction signal is output may be so set as will not to execute the control for decreasing the engine output prior to disconnecting the clutch when a difference in the rotational speed of the transmission input shaft before and after the change of gear is not larger than a predetermined difference in the rotational speed. For example, when a difference in the rotational speed of the transmission input shaft is small before and after the change of gear of shifting up, the pre-reduction control is not executed to quickly change the gear and to return the engine back to the accelerator pedal-follow control that responds to the driver's will.

BRIEF DESCRIPTION OF THE DRAWINGS

FIG. 6 is a diagram illustrating, with the passage of time, the operation of the vehicle power transmission device relying upon a conventional engine controller.

BEST MODE FOR CARRYING OUT THE INVENTION

Figure 1:
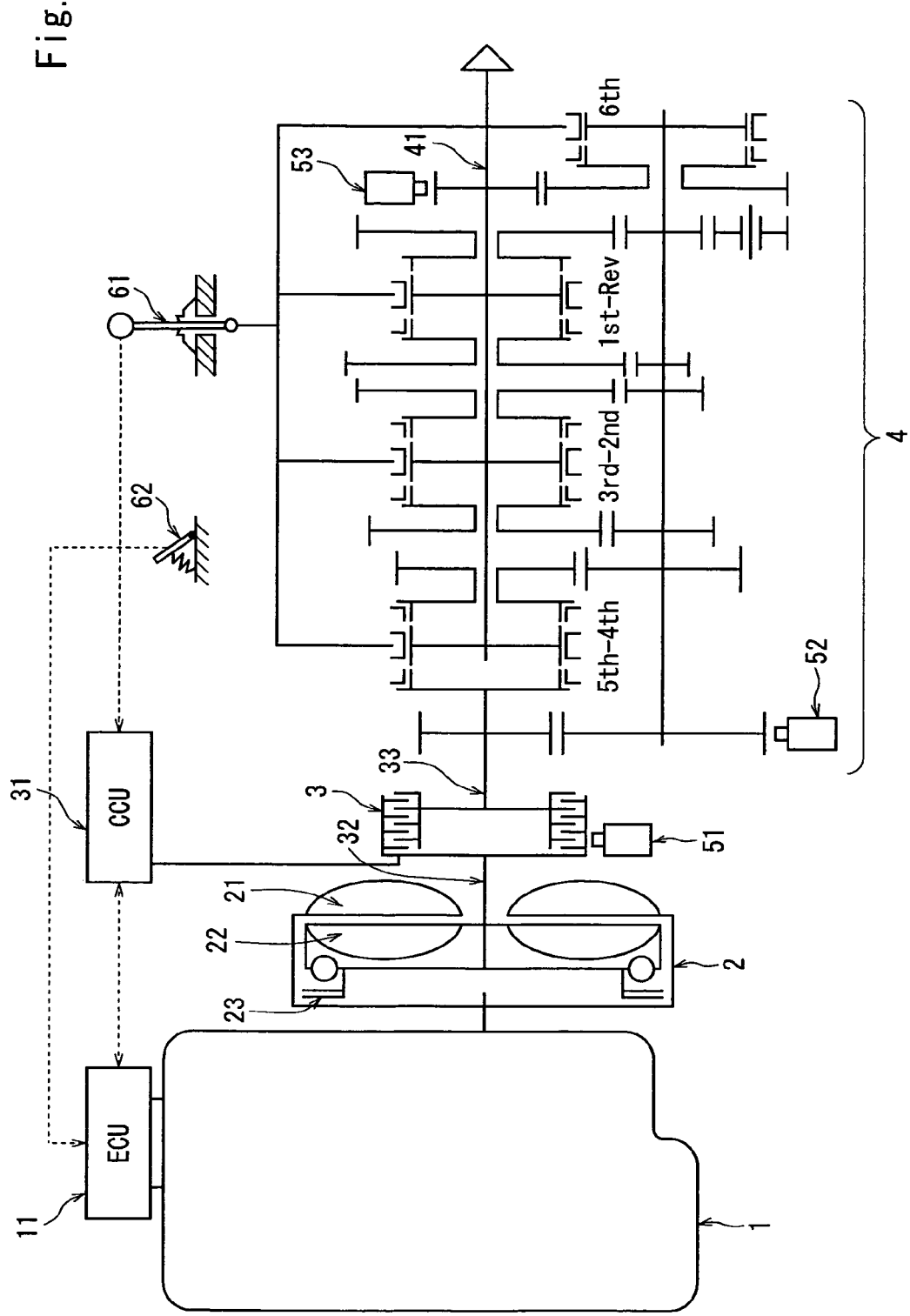
FIG. 1 is a schematic diagram of a vehicle power transmission device to which a vehicle controller of the present invention is applied.

Described below with reference to the drawings is a controller in a vehicle power transmission device according to the present invention. Equipment constituting the vehicle power transmission device to which the invention is applied are not particularly different from those of the conventional device shown in FIG. 1. That is, in the power transmission device, a fluid coupling 2 is linked at the back of a diesel engine 1 and a transmission 4 having a parallel axis gear mechanism is further linked thereto via a wet multi-plate clutch 3 which is a clutch for automatically accomplishing connection and disconnection. A pump 21 and a turbine 22 of the fluid coupling 2 are coupled together by a lockup clutch 23 except when the vehicle is going to start and, thus, the output shaft of the diesel engine 1 is directly coupled to the input shaft 31 of the wet multi-plate clutch 3.

Further, the diesel engine 1 is equipped with an engine controller 11 and the wet multi-plate clutch 3 is equipped with a clutch controller 31, and these controllers are so linked together as to control the diesel engine 1 and the wet multi-plate clutch 3. Normally, the engine controller 11 executes the accelerator pedal-follow control and, at the time of changing the gear, is changed over to a mode of gear-change engine control in response to a gear-change instruction signal A. That is, in response to the gear-change instruction signal A, the engine controller 11 discontinues the accelerator pedal-follow control, and controls the diesel engine 1 independently of the amount the accelerator pedal 62 is depressed to greatly suppress the amount of fuel supply. These controllers receive rotational speed signals from a rotational speed sensor 51 that detects the rotational speed of the input shaft 32 of the wet multi-plate clutch 3, from a rotational speed sensor 52 that detects the rotational speed of the output shaft of the wet multi-plate clutch 3, and from a rotational speed sensor 53 that detects the rotational speed of the output shaft of the transmission 4. The controllers use the rotational speed signals for the control operation at the time of changing the gear.

Figure 2:
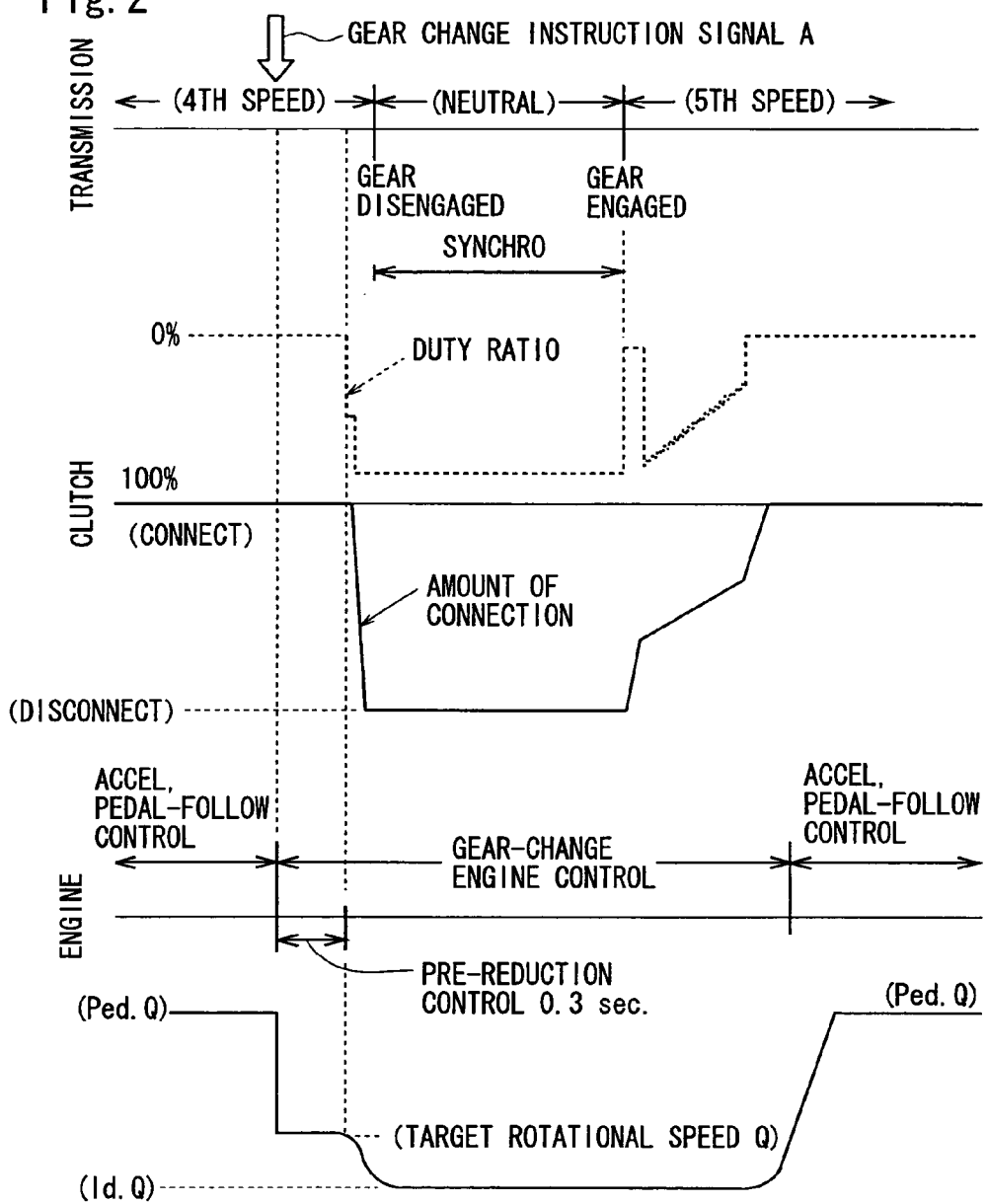
FIG. 2 is a diagram illustrating, with the passage of time, the operation of the vehicle power transmission device relying upon the vehicle controller of the present invention.

Next, described below with reference to FIG. 2 is the operation, at the time of changing the gear, of the controller in the vehicle power transmission device according to the present invention. FIG. 2 is a diagram of operation corresponding to FIG. 6 that illustrates a conventional controller, and illustrates the operations of the transmission 4, wet multi-plate clutch 3 and diesel engine 1 that are controlled with the passage of time.

At the time of changing the gear, when a gear-change instruction signal A for shifting up is output from a knob of a gear-change lever 61 or from an electronic controller of the vehicle, the engine controller 11 discontinues the accelerator pedal-follow control that had been executed so far and performs a mode of gear-change engine control. In the gear-change engine control of this embodiment, the engine controller 11, first, judges whether it is necessary to conduct the pre-reduction control for squeezing the amount of fuel supply. This judgement, however, may be omitted and there may be executed the pre-reduction control in a suitable amount at all times.

Even at the time of changing the gear for shifting up, the difference in the rotational speed before and after the change of gear may not often be so large depending upon the cases. The rotational speed of the transmission input shaft becomes the one obtained by multiplying the rotational speed of the output shaft 41 of the transmission by a gear ratio of the gear. For example, when the vehicle speed (rotational speed of the output shaft 41 of the transmission) is small and a change in the gear ratio at the time of shifting up is small, a change in the rotational speed of the engine is small, too, before and after the change of the gear. In this case, the transmission 4 is quickly synchronized without almost producing flare, and there is no need of executing the pre-reduction control.

Figure 3:
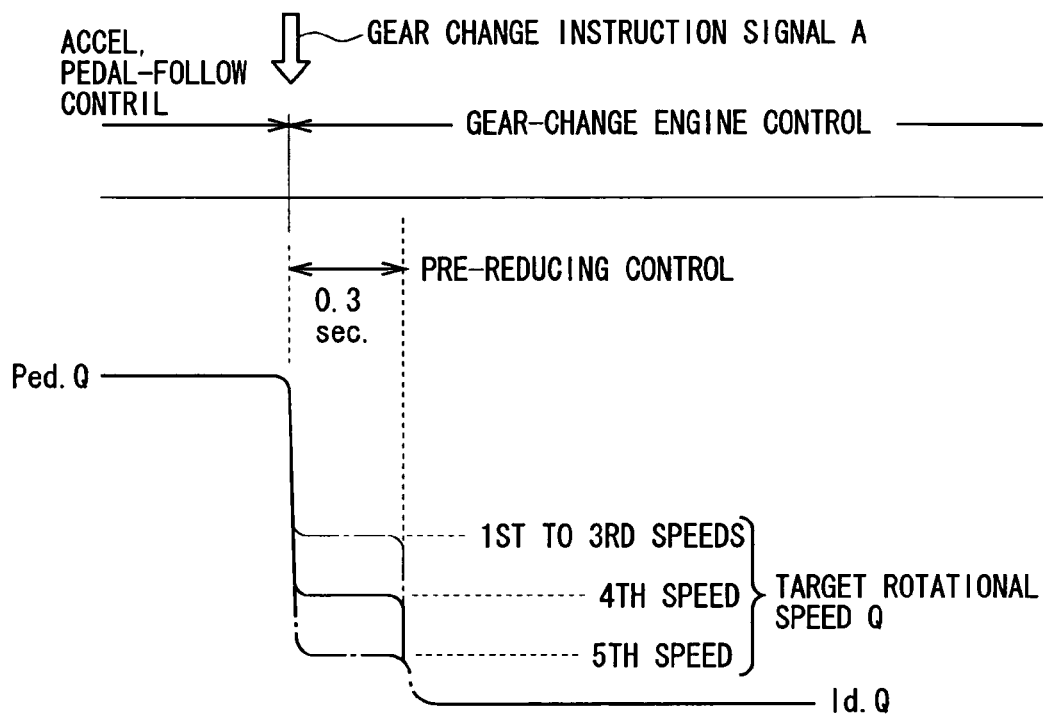
FIG. 3 is a diagram illustrating the control operation of the vehicle controller according to the present invention.

Upon judging that the pre-reduction control is necessary, the engine controller 11 decreases the amount of fuel supply to suppress the output of the diesel engine 1 prior to disconnecting the wet multi-plate clutch 3. Under a condition where a constant load is exerted on the engine as shown in FIG. 3, the rotational speed of the engine increases with an increase in the amount of fuel supply, and a predetermined relationship exists between the rotational speed of the engine and the amount of the fuel. When shifting up from the fourth speed to the fifth speed in this embodiment, the rotational speed which is one-third the engine rotational speed of when the gear-change instruction signal A is output is used as a target rotational speed, and the amount of fuel fed to the diesel engine 1 is set to be the amount of fuel that corresponds to the target rotational speed in order to decrease the engine output (Ped. Q in the engine of FIG. 2 is shifted to a desired rotational speed Q).

Figure 4:
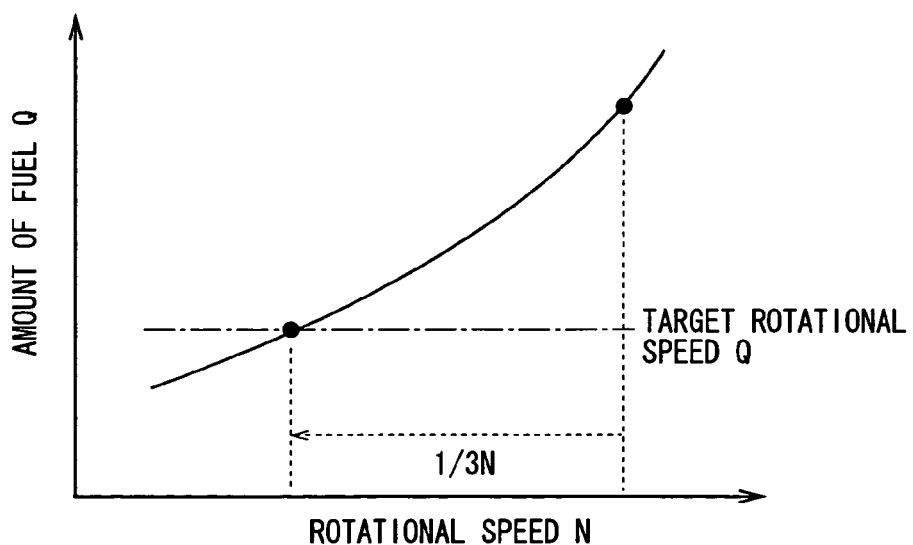
FIG. 4 is a diagram illustrating a relationship between the amount of fuel and the rotational speed of the engine.

In the present invention, the target value for decreasing the rotational speed by the pre-reduction control is set depending upon the vehicle operating conditions of when the gear-change instruction signal A is output. When the vehicle is in operation using the low gear in a state where the accelerator pedal is depressed and when the amount of fuel is sharply decreased under a condition of a large acceleration, there occurs a shock of gear-change creating the same result as that of "acceleration spoiling" like when the transmission of engine output is shut off by disconnecting the clutch. In this embodiment, therefore, the target rotational speed in the pre-reduction control is determined depending upon the gear at the time of shifting up, and is set to be one-half the engine rotational speed of when the gear-change instruction signal A is generated in the case of the first speed up to the third speed as shown in FIG. 4 to gradually lower the acceleration of the vehicle and to prevent deterioration in the operability. When traveling using a high gear, the acceleration is not great. Therefore, the target rotational speed is set to be one-third with the fourth gear and is set to be one-fourth with the fifth gear to prevent an abrupt rise in the rotational speed when the clutch is disconnected to change the gear.

In the above embodiment, the target rotational speed is set depending upon the engine rotational speed at a moment when the gear-change instruction signal A is output to decrease the engine output in the pre-reduction control. By taking into consideration that the engine rotational speed at the time of changing the gear has nearly been determined depending upon the gear, however, it is also allowable to set a target rotational speed in advance depending upon the gear while the vehicle is in operated operation separately from the above method of setting. For instance, the target rotational speed may be set to be 1000 rpm for the first to third speeds, 800 rpm for the fourth speed, and 700 rpm for the fifth speed irrespectively of the engine rotational speed at the time when the gear-change instruction signal is output, and the fuel may be supplied to the diesel engine 1 in amounts corresponding thereto.

It is further allowable to decrease the engine output by the pre-reduction control by setting a target value depending upon the amount of fuel fed to the engine of when the gear-change instruction signal A is output while the vehicle is in operation without setting a target engine rotational speed. For example, the target amount of fuel to be supplied to the diesel engine 1 is set to be one-half the amount of fuel in the case of the first to third speeds and one-third in the case of fourth speed and is set to be one-fourth in the case of the fifth speed by the pre-reduction control to decrease the engine output.

To avoid the occurrence of shock of gear-change and to avoid the occurrence of flare at the time of changing the gear, the pre-reduction control is executed for a predetermined period of time, for example, 0.3 seconds as shown FIG. 2. After the end of the pre-reduction control, the clutch controller 31 produces a pulse of a duty ratio of 100% to disconnect the wet multi-plate clutch 3. When the wet multi-plate clutch 3 is disconnected, the diesel engine 1 is separated away from the transmission 4; i.e., the transmission 4 becomes neutral due to the same operation as that of the prior art described with reference to FIG. 6, whereby the synchronizing mechanism works to start a mesh with a new gear (fifth speed). After the end of the pre-reduction control, the engine controller 11 decreases the amount of fuel to the diesel engine 1 down to the amount of fuel of during the idling of the engine to prevent the engine rotational speed from suddenly increasing as a result of disconnecting the wet multi-plate clutch 3.

As will be understood from a graph on the lower side of FIG. 2 representing a change in the rotational speed, the pre-reduction control is executed for decreasing the engine output prior to disconnecting the wet multi-plate clutch 3 whereby the rotational speed of the diesel engine 1 (rotational speed of the input shaft 32 of the wet multi-plate clutch 3) does not quickly increase preventing the occurrence of flare shown in FIG. 6. The rotational speed of the input shaft of the transmission (rotational speed of the output shaft 33 of the wet multi-plate clutch 3) becomes the rotational speed of the fifth speed after the gear of the transmission 4 has engaged. Here, however, the rotational speed of the diesel engine 1 does not increase at the time of changing the speed. Therefore, the rotational speed of the diesel engine 1 comes into agreement with the rotational speed of the input shaft of the transmission in an early time as compared to the case of FIG. 6.

When the clutch controller 31 is going to connect the wet multi-plate clutch 3 after the gear has been engaged, the difference is becoming small between the rotational speed of the input shaft 32 of the wet multi-plate clutch 3 and the rotational speed of the output shaft 33 thereof. Therefore, it becomes possible to quickly increase the amount of connecting the wet multi-plate clutch 3 as compared to the case of FIG. 6. Therefore, the wet multi-plate clutch 3 is completely connected in an early time to end the mode of gear-change engine control enabling the diesel engine 1 to return back to the accelerator pedal-follow control that is controlled depending upon the amount the accelerator pedal is depressed by the driver. That is, the time required for changing the speed is shortened.

Figure 5:
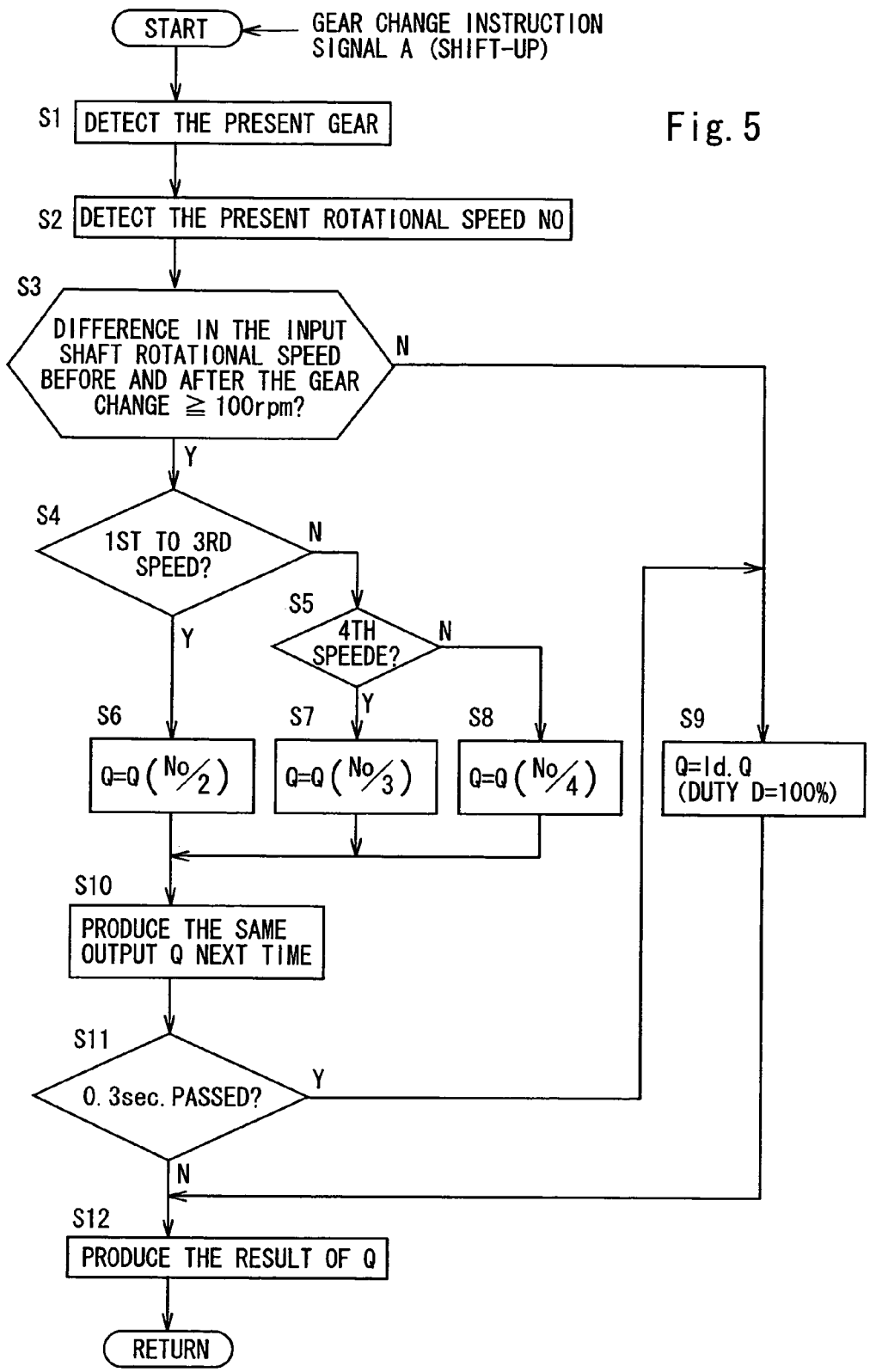
FIG. 5 is a flowchart illustrating the operation of the vehicle controller according to the present invention.

FIG. 5 is a flowchart illustrating the operation of the engine controller that executes the pre-reduction control according to the above embodiment of the invention. Here, the flow is that of the engine controller 11 for executing the gear-change engine control after the gear-change instruction signal A is generated.

When the gear-change instruction signal A for shifting up is output, the gear with which the vehicle is in operation is detected (S1), and the engine rotational speed NO at this moment (same as the rotational speed of the transmission input shaft since the wet multi-plate clutch 3 has been connected) is detected (S2). Here, by using a gear ratio of the gear, a gear ratio of the gear one speed over and the engine rotational speed NO, a difference in the rotational speed of the transmission input shaft is calculated before and after the change of gear, and it is judged if the difference in the rotational speed is not larger than 100 rpm (S3). When the difference in the rotational speed is not larger than 100 rpm, the pre-reduction control does not have to be executed. The routine therefore proceeds to step S9 where the amount Q of fuel fed to the diesel engine 1 is set to be equal to the amount of fuel at the time of idling the engine and, at the same time, the duty ratio of the clutch controller 31 is set to be 100% to disconnect the wet multi-plate clutch 3.

This embodiment is provided with the judgement at S3 as means for determining whether the pre-reduction control be executed. The present invention, however, can be put into practice in an embodiment of omitting the judgement of S3. As the vehicle operating condition for determining whether the pre-reduction control be executed, further, there can be employed, for example, a factor related to the amount of fuel supplied to the engine in addition to the difference in the rotational speed of the transmission input shaft before and after the change of gear.

When the difference in the rotational speed is not smaller than 100 rpm at step S3, the pre-reduction control must be executed. Therefore, the speed is detected (S4, S5) concerning the gear that is detected at step 1. When the gear Thereafter, the wet multi-plate clutch 3 is disconnected, and the amount of fuel of the diesel engine 1 becomes the amount of fuel of during the idling of the engine. The gear-change engine control is continued until the wet multi-plate clutch 3 is completely connected.

INDUSTRIAL APPLICABILITY

As described above in detail, the present invention deals with a vehicle power transmission device equipped with an automatic clutch, wherein, at the time of changing the gear for shifting up, the engine output is decreased prior to disconnecting the clutch to suppress an increase in the engine rotational speed and to avoid the flare at the time of changing the gear, and a target value is suitably set for decreasing the engine output depending upon the operating conditions of the vehicle prior to disconnecting the clutch in order to prevent the occurrence of flare in all gears while suitably relaxing the "acceleration spoiling". It will therefore be obvious that the invention can be utilized for a variety kinds of vehicle power transmission devices inclusive of a device which has, for example, a dry single-plate clutch and which controls the amount of connection thereof relying upon the stroke of a clutch actuator. Further, it needs not be pointed out that the engine used for the power transmission device to which the invention is applied may be either a diesel engine or a gasoline engine and that a fluid coupling may or may not be interposed.

The invention claimed is:

1. A vehicle controller of a vehicle power transmission device including an engine, a clutch and a transmission, wherein:

said clutch is equipped with a clutch controller which disconnects said clutch at the time of gear change of said transmission;

said engine is equipped with an engine controller which controls the engine based on the amount the accelerator pedal is depressed as a basic parameter, wherein at the time of gear-change, said engine controller, in response to a gear-change instruction signal, performs a gear-change engine control for controlling said engine independently of said amount the accelerator pedal is depressed; and in said gear-change engine control at the time of gear-change of shifting up, said engine controller executes a control for decreasing said engine output for a predetermined period of time prior to disconnecting said clutch, and the target value for decreasing the output depends upon the vehicle operating conditions of when said gear-change instruction signal is output.

2. The vehicle controller of a vehicle power transmission device according to claim 1, wherein said target value for decreasing the output is set depending upon the gear position of when the gear-change instruction signal is output while the vehicle is in operation, and the target value for decreasing the output is set to become smaller as a higher gear is used.

3. The vehicle controller of a vehicle power transmission device according to claim 1, wherein said target value for decreasing the output is set as a target value for decreasing the rotational speed.

4. The vehicle controller of a vehicle of a vehicle power transmission device according to claim 3, wherein said target value for decreasing the rotational speed is set depending upon the rotational speed of said engine of when said gear-change instruction signal is output.

5. The vehicle controller of a vehicle power transmission device according to claim 1, wherein said target value for decreasing the output is set depending on the amount of fuel supplied to said engine of when said gear-change instruction signal is output.

6. The vehicle controller of a vehicle power transmission device according to claim 1, wherein said vehicle controller is provided with means which determines whether the control be executed for decreasing the engine output prior to disconnecting said clutch depending upon the vehicle operating conditions of when said gear-change instruction signal is output.

7. The vehicle controller of a vehicle power transmission device according to claim 6, wherein the vehicle operating conditions of when said gear-change instruction signal is output are so set as will not to execute the control for decreasing the engine output prior to disconnecting said clutch when a difference in the rotational speed of the transmission input shaft before and after the change of speed is not larger than a predetermined difference in the rotational speed.

8. The vehicle controller of a vehicle power transmission device according to claim 2, wherein said target value for decreasing the output is set as a target value for decreasing the rotational speed.

9. The vehicle controller of a vehicle power transmission device according to claim 2, wherein said target value for decreasing the output is set depending on the amount of fuel supplied to said engine of when said gear-change instruction signal is output.

* * * * *